United States Patent [19]

Gripenberg et al.

[11] Patent Number: 5,527,380
[45] Date of Patent: Jun. 18, 1996

[54] RECOVERY OF NON-FERROUS METALS FROM DROSS

[75] Inventors: Henrik Gripenberg, Stockholm, Sweden; Hans-Walter Gräb, Babenhausen; Michael Müllerthann, Voerde, both of Germany

[73] Assignees: AGA Aktiebolag, Lidingo, Sweden; Hoogovens Aluminium Huttenwerk GmbH, Voerde, Germany

[21] Appl. No.: 295,699

[22] PCT Filed: Feb. 25, 1992

[86] PCT No.: PCT/SE92/00111

§ 371 Date: Oct. 19, 1994

§ 102(e) Date: Oct. 19, 1994

[87] PCT Pub. No.: WO93/17135

PCT Pub. Date: Sep. 2, 1993

[51] Int. Cl.⁶ .................................................. C22B 7/00
[52] U.S. Cl. .................................................. 75/585; 75/672
[58] Field of Search .................................... 75/672, 10.21, 75/585

[56] References Cited

U.S. PATENT DOCUMENTS

| | | |
|---|---|---|
| 3,759,702 | 9/1973 | Horak . |
| 4,040,820 | 8/1977 | Loach et al. ........................ 75/672 |
| 4,925,237 | 8/1990 | Dube et al. . |
| 4,960,460 | 10/1990 | Dube et al. ........................ 75/10.21 |
| 4,997,476 | 3/1991 | Lindsay et al. . |
| 5,122,181 | 6/1992 | Dube et al. . |

FOREIGN PATENT DOCUMENTS

| | | |
|---|---|---|
| 0322207 | 6/1989 | European Pat. Off. . |
| 0400925 | 12/1990 | European Pat. Off. . |
| 0576255 | 12/1993 | European Pat. Off. . |
| WO92/09708 | 6/1992 | WIPO . |
| 92/12265 | 7/1992 | WIPO . |
| 93/06254 | 4/1993 | WIPO . |

OTHER PUBLICATIONS

The Alcan Plasma Dross Treatment Process, A New Salt–Free Dross Processing Technology, Lavoie et al., *Second International Symposium–Recycling of Metals and Engineered Materials*, The Minerals, Metals, & Materials Society, 1990, pp. 451–462.

*Primary Examiner*—Melvyn Andrews
*Attorney, Agent, or Firm*—Pollock, Vande Sande & Priddy

[57] ABSTRACT

A method for recovering non-ferrous metal from a dross that includes the non-ferrous metal includes introducing the dross into a rotary furnace or rotatable converter. The furnace or converter has a refractory lining. Oxygen and a fossil fuel are supplied to an oxy-fuel burner. The oxygen is supplied as a combustion gas including at least eighty percent oxygen. The oxygen and fossil fuel are combusted to generate an initial combustion energy. The dross is heated to a temperature above a melting point of the non-ferrous metal by supplying the initial combustion energy to the furnace or converter. The heating takes place in the absence of a protective salt layer. The non-ferrous metal and a non-metallic residue are recovered from the furnace or converter.

20 Claims, 1 Drawing Sheet

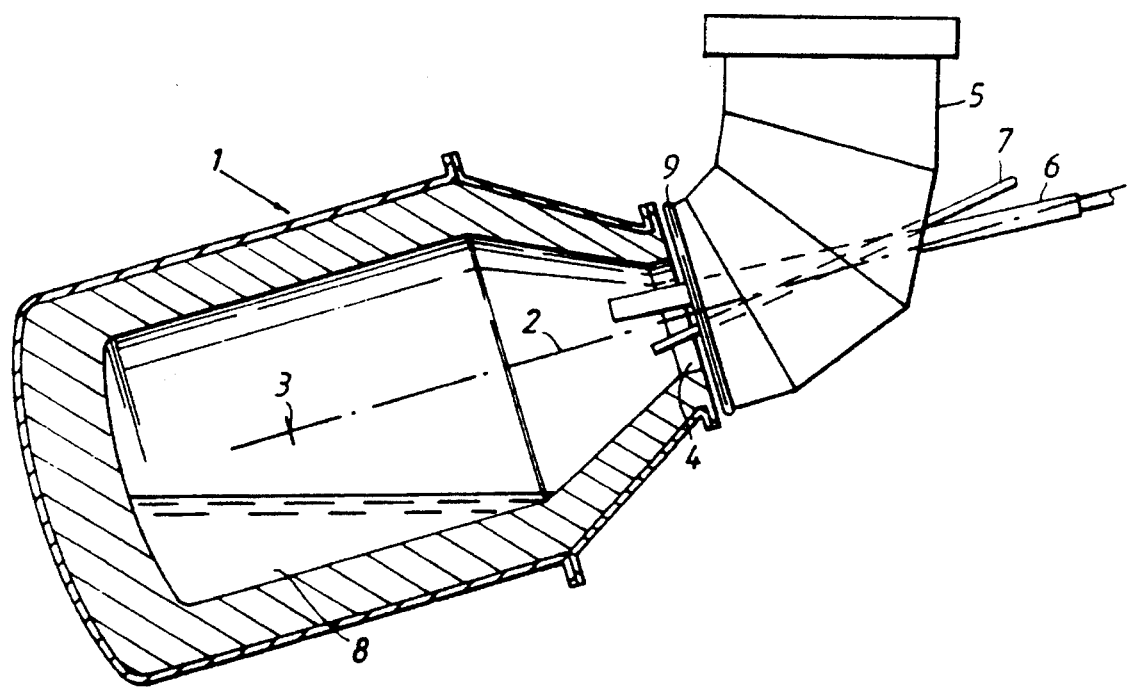

RECOVERY OF NON-FERROUS METALS FROM DROSS

FIELD OF THE INVENTION

The present invention relates to a method of recovering a non-ferrous metal from a dross starting material that contains the metal, possibly together with non-ferrous metal scrap, and/or a starting material comprised of such scrap. The method includes the steps of feeding the starting material to a rotary furnace or a rotatable converter provided with a refractory lining, heating the starting material to a temperature above the melting point of the metal while rotating the furnace continuously or intermittently, and removing the resultant molten metal from remaining dross residues and/or from resultant solid dross residues.

BACKGROUND OF THE INVENTION

Methods for recovering non-ferrous metals from dross are known to art. For example, the Canadian Patent 1,255,914 teaches a method for recovering non-ferrous metal from non-ferrous-metal containing dross. The method includes the steps of feeding the dross into a rotary furnace that has a refractory lining, directing a plasma burner into the furnace so as to heat the dross to a temperature above the melting point of the metal, rotating the furnace either continuously or intermittently, and removing the molten, separated metal from the solid dross residue.

It is also known to recover non-ferrous metals from dross and metal waste with the aid of oxy-fuel-burners while using a protective layer of salts. This layer may include sodium chloride (NaCl), potassium chloride (KCl) in roughly equal quantities with respect to weight, and may also contain a flux, for instance cryolite. The effect of the salt layer on the coalescence of aluminum droplets when treating aluminum dross is described, for instance, in the Second International Symposium; Recycling of metals and engineered materials, The minerals, metals and materials Society, 1990, pages 69–84, by Ray D. Petersen, entitled "Effect of salt flux additives on aluminum droplet coalescence". In an article entitled "Interfacial phenomena in molten aluminum and salt systems" published in the same reference, pages 85–103, Francis K. Ho and Yogesh Sahai describe the remelting of aluminum waste beneath a salt layer.

SUMMARY OF THE INVENTION

An object of the present invention is to recover, or win, non-ferrous metal from a dross starting material that contains the metal. The dross starting material may also include non-ferrous metal waste, and/or a starting material containing such waste. The non-ferrous metal is recovered, or winned with the aid of an oxy-fuel-burner and in the absence of a protective salt layer.

Another object of the present invention is to reduce the formation of corrosive salt vapors that are obtained when using protective salt layers, and to obtain an oxidic rest product that is free from water-soluble salts, thereby benefitting the environment.

These objects are achieved with a method for recovering, or winning, a non-ferrous metal from a dross starting material that contains the metal. The dross starting material may also include non-ferrous metal waste, and/or from a starting material that contains such waste. The method comprises the steps of introducing the starting material into a rotary furnace or a rotatable converter provided with a refractory lining; heating the starting material to a temperature above the melting point of the metal, while rotating the furnace either continuously or intermittently; and removing the resultant molten metal from the overlying dross residue. The method is particularly suited for the recovery of aluminum from aluminum-containing dross and from aluminum scrap.

The inventive method is characterized by heating the starting material with a so-called oxy-fuel-burner in the absence of a protective salt layer. The burner is supplied with a fossil fuel and with a gas that contains at least 80% oxygen. The furnace is rotated at a speed of 5 r.p.m or lower.

BRIEF DESCRIPTION OF THE DRAWINGS

The invention will now be described in more detail with reference to the accompanying drawing, the single Figure of which is a vertical section view of the rotatable converter and associated equipment.

DETAILED DESCRIPTION OF THE INVENTION

The Figure illustrates a converter 1 whose center axis 2 defines an acute angle with the horizontal plane. The angle may be, for example, an angle of 10°–25°. The converter 1 is rotatable about its center axis 2 and is pivotal about a horizontal axis 3 that extends perpendicularly to and passes through the center axis 2 of the converter 1. The upwardly directed end of the converter 1 narrows into an opening 4. A protective hood 9 is mounted on the upstream side of the opening. The hood 9 merges with a curved, tubular structure 5. One end, or a first end, of the hood 9 is positioned as close as possible to the converter opening 4 without actually coming into contact with the rotatable converter 1. The tubular member 5 is curved and its distal end faces upwards. The tubular member 5 is held in place by means of devices not shown and can be easily removed from the converter opening 4, so as to enable the converter 1 to be filled and emptied. A so-called oxy-fuel-burner 6 is inserted through an opening provided in the curved part, or knee-bend, of the tubular member 5. The nozzle orifice of the burner extends slightly into the converter 1 when the first end of the tubular member 5 is located immediately in front of the converter opening 1. The requisite fuel, oxygen and cooling water connections are not shown. A lance 7 is inserted through another opening in the knee-bend of the tubular member.

When carrying the inventive method into effect, the starting material 8, which may have the form of aluminum dross and/or aluminum scrap, for instance, is introduced into the converter 1, with the tubular member 5, the burner 6 and the lance 7 moved to one side. The tubular member 5, and, therewith, the burner 6 and lance 7, is then placed tightly in front of the converter opening. The converter is then rotated at a speed of up to 5 rpm, and the burner is ignited for heating the starting material 8. The burner is normally operated with a fossil fuel, for instance a hydrocarbon, such as propane, and with an oxygen-containing gas having an oxygen content of at least 80%, and, preferably, also containing small amounts of nitrogen. The oxygen-containing gas used may be comprised of oxygen having a concentration of about 93% oxygen from a PSA-plant. The remainder of the gas may consist of argon, or may be comprised of oxygen taken from an air separation plant. The burner flame is preferably directed onto a point on the bottom of the converter spaced from the converter axis 2. Because the amount of oxygen supplied to the burner 6 is less than the stoichiometric amount, or possibly equal to the stoichiometric amount, that is, an amount that corresponds to from 80 to 100% of the oxygen required for complete combustion, oxidation of metal in the converter 6 is minimized.

When the starting material, for instance aluminum-containing dross, has reached a temperature above the melting point of aluminum, the aluminum will begin to melt and rotation of the converter will cause the spherical bodies that encapsulate an aluminum core and have a surrounding protective aluminum-oxide shell to deform and the protective shell to disintegrate. The aluminum, which is now in a liquid state, begins to run down and coalesce with molten aluminum that exits from other spheres. The molten aluminum is collected in the lowermost region of the converter. When the maximum amount of aluminum possible has melted and collected beneath the overlying dross residues, the protective hood 5 is removed, so as to enable the molten metal to be tapped from the converter 1.

According to one preferred embodiment of the invention, when the metal begins to melt, the rotational speed of the converter is raised to 25 r.p.m while simultaneously reducing burner power to 50–10% of the original power. Heating of the metal is terminated when the temperature in the melt has reached a level of 750°–950° C., whereafter the molten metal is tapped from the converter in a conventional manner.

According to another embodiment of the invention, power is supplied intermittently to the converter at the higher rotational speed of up to 25 rpm. In order to prevent ingress of atmospheric oxygen into the converter, and, therewith, oxidize any aluminum that may not be protected by a layer of dross or some other rest product, an inert shielding gas is introduced into the converter, so as to maintain an overpressure therein. This inert gas is preferably argon. As illustrated in the drawing, the shielding gas is introduced through a lance that is connected to a source of shielding gas. Alternatively, the gas may be introduced through the burner, for instance through its oxygen nozzle, which may be switched alternately between connection with an oxygen source and connection with a shielding gas source. Although not shown, the burner is also connected to a fossil-fuel delivery line.

EXAMPLE

Aluminum-containing dross obtained from the manufacture of a series 3000 aluminum alloy was introduced into a converter whose longitudinal axis defined an angle of about 17° with the horizontal plane. 1240 kg of pure dross were charged to the converter. The dross comprised 66% by weight metallic aluminum, 30% by weight aluminum trioxide, and the remainder oxides of silicon, iron and calcium.

Subsequent to introducing the dross, in the absence of protective salt layers, the protective hood, with an oxy-fuel-burner fitted thereto, was placed in front of the converter opening, at a short distance therefrom. The burner had a power output of 1 MW and was operated with propane and pure oxygen, that is an oxygen-containing gas which comprised at least 99.5% oxygen. The converter was rotated at a speed of about 1 r.p.m, with the burner operating at full power, until the dross had heated to the point at which the aluminum melts, the temperature of the material in the converter being about 750° C.

The power output of the burner was then reduced to about 200 kW and the converter was rotated continuously at a speed of 8 rpm. Subsequent to having heated the material in the converter at this reduced power over a period of 20 minutes, the metallic aluminum was found to have separated from the dross, which now lay in a covering layer over the molten metal.

711 kg of pure aluminum was obtained, corresponding to a yield of 57% and a process efficiency of 88%, based on the amount of metallic aluminum charged and the amount of pure aluminum obtained. The consumption of fossil fuel corresponded to 252 kWh for each ton of dross introduced, while the oxygen consumption corresponded to 44 normal cubic meters for each ton of dross introduced. The total process time was 32 minutes. The resultant rest product comprised of pure oxides of the aforesaid metals and aluminum.

Highly satisfactory results have been achieved when the starting material charged to the converter was comprised partially of scrap containing the same metal as that contained by the dross.

When solely scrap is charged to the converter, and then particularly solely aluminum scrap, it is necessary for the process of combustion required to generate thermal energy takes place under sub-stoichiometric conditions, due to the tendency of this metal to readily oxidize. When the supply of hot combustion gases is interrupted periodically, it is particularly necessary to take measures that will prevent atmospheric oxygen from penetrating to the metal. As before mentioned, an overpressure is preferably maintained in the converter, by supplying a shielding gas, such as argon, to the converter.

I claim:

1. A method for recovering non-ferrous metal from a solid dross including said non-ferrous metal, said method comprising the steps of:

a) introducing the solid dross into a rotary furnace or rotatable converter, said furnace or said converter having a refractory lining;

b) heating the solid dross to a temperature above a melting point of the non-ferrous metal by supplying combustion energy generated by reacting a fossil fuel with oxygen in an oxy-fuel burner, said heating taking place in the absence of a protective salt layer, said oxygen being supplied to said oxy-fuel burner as a gas including at least eighty percent oxygen;

c) continuously or intermittently rotating said furnace or converter at a rotational speed simultaneously with said heating; and d) recovering said non-ferrous metal and a non-metallic residue from said furnace or converter.

2. A method for recovering non-ferrous metal from a solid dross that includes said non-ferrous metal, said method comprising the steps of:

a) introducing the solid dross into a rotary furnace or rotatable converter, said furnace or said converter having a refractory lining;

b) supplying oxygen and a fossil fuel to an oxy-fuel burner, said oxygen being supplied as a combustion gas including at least eighty percent oxygen;

c) combusting said oxygen and said fossil fuel to generate an initial combustion energy;

d) heating the solid dross to a temperature above a melting point of the non-ferrous metal by supplying said initial combustion energy to said furnace or converter, said heating taking place in the absence of a protective salt layer; and e) recovering said non-ferrous metal and a non-metallic residue from said furnace or converter.

3. A method according to claim 2, further comprising the step of continuously or intermittently rotating said furnace or converter at a rotation speed simultaneously with said heating.

4. A method according to claim 3, wherein said furnace or converter is rotated continuously.

5. A method according to claim 3, wherein said furnace or converter is rotated intermittently.

6. A method according to claim 3, said method further comprising the steps of:

reducing said initial combustion energy by from fifty to ninety percent;

increasing said rotational speed to from five to twenty-five rotations per minute; and continuing to supply said reduced combustion energy to said furnace or converter until said non-ferrous metal has melted;

wherein said further steps are carried out subsequent to the dross reaching a temperature above said melting point of said non-ferrous metal.

7. A method according to claim 6, further comprising the steps of:

intermittently supplying said reduced combustion energy to said furnace or converter while said rotational speed is increased; and introducing an inert gas into said furnace or converter during a period while said reduced combustion energy is not being supplied to said furnace or converter.

8. A method according to claim 7, wherein said inert gas is supplied through said oxy-fuel burner.

9. A method according to claim 7, wherein said inert gas is supplied through a lance introduced into said furnace or converter.

10. A method according to claim 7, wherein said inert gas is argon.

11. A method according to claim 2, wherein said fossil fuel and said oxygen are supplied to said oxy-fuel burner in a stoichiometric amount.

12. A method according to claim 2, wherein said oxygen is supplied to said oxy-fuel burner at most twenty percent below a stoichiometric amount.

13. A method according to claim 2, wherein said combustion gas is supplied to said furnace or converter at an amount greater than a stoichiometric amount.

14. A method according to claim 2, further comprising the steps of:

terminating said heating and tapping said non-ferrous metal from said furnace or converter when said non-ferrous metal has been heated to a temperature within a range of 750°–950° C.

15. A method according to claim 6, further comprising the steps of:

terminating said heating and tapping said non-ferrous metal from said furnace or converter at a point from five to sixty minutes from the time of increasing said rotational speed of said furnace or converter.

16. A method according to claim 1, said method further comprising the steps of:

reducing said combustion energy by from fifty to ninety percent;

increasing said rotational speed to from five to twenty-five rotations per minute; and continuing to supply said reduced combustion energy to said furnace or converter until said non-ferrous metal has melted;

wherein said further steps are carried out subsequent to the dross reaching a temperature above said melting point of said non-ferrous metal.

17. A method according to claim 16, further comprising the steps of:

intermittently supplying said reduced combustion energy to said furnace or converter while said rotational speed is increased; and introducing an inert gas into said furnace or converter during a period while said reduced combustion energy is not being supplied to said furnace or converter.

18. A method according to claim 17, wherein said inert gas is argon.

19. A method according to claim 1, wherein said oxygen is supplied to said oxy-fuel burner at most twenty percent below a stoichiometric amount.

20. A method according to claim 1, wherein said combustion gas is supplied to said furnace or converter at an amount greater than a stoichiometric amount.

* * * * *